July 24, 1956
R. J. ARNDT
2,755,718
SELF-PROPELLED ROTARY TILLER
Filed Jan. 10, 1955
2 Sheets-Sheet 1
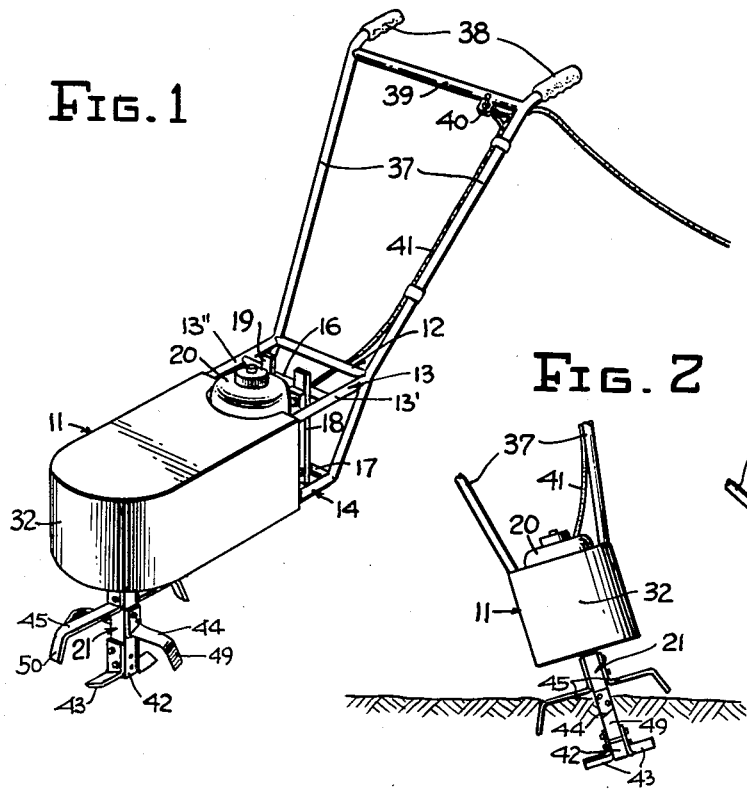
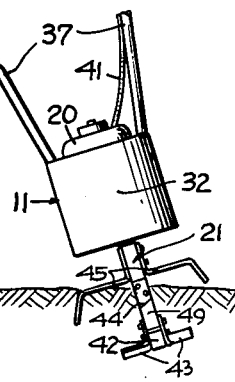
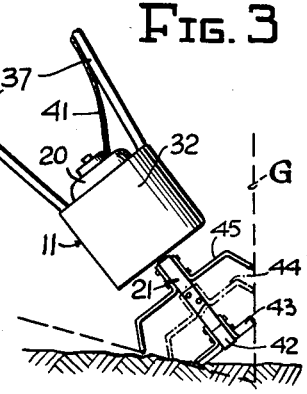
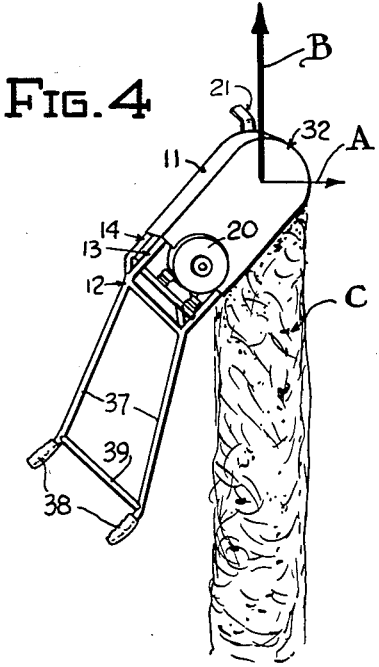
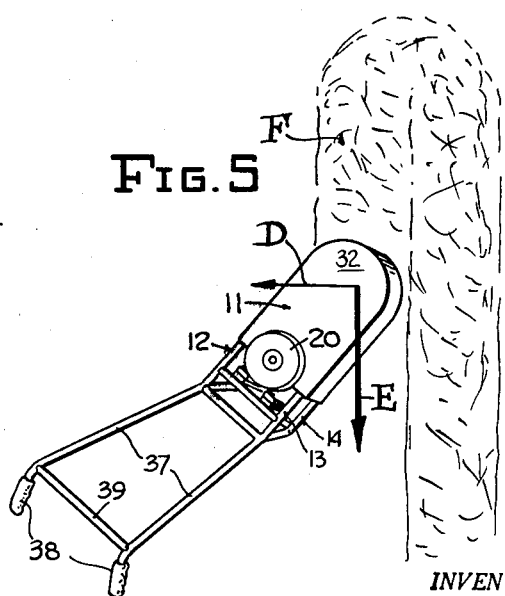
INVENTOR.
Raymond J. Arndt
BY
Hansen and Lane
HIS ATTORNEYS.

July 24, 1956 R. J. ARNDT 2,755,718
SELF-PROPELLED ROTARY TILLER
Filed Jan. 10, 1955 2 Sheets-Sheet 2
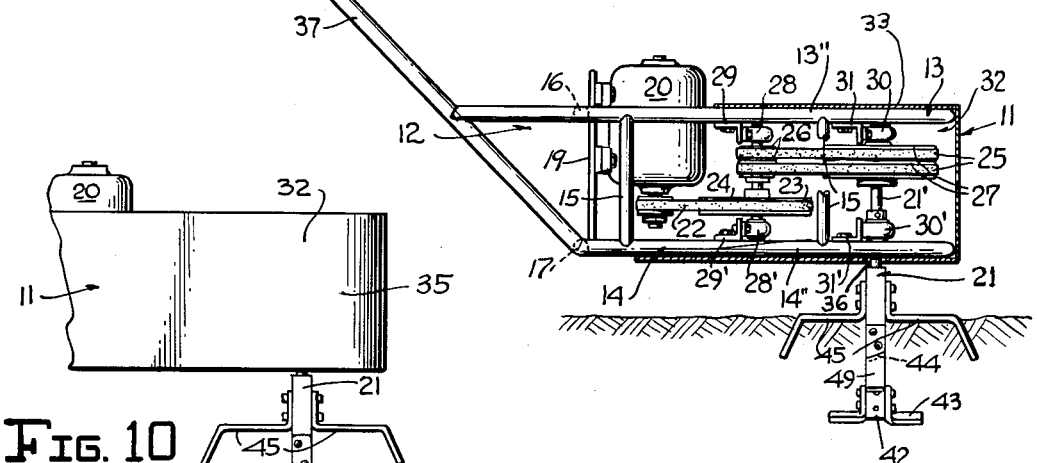
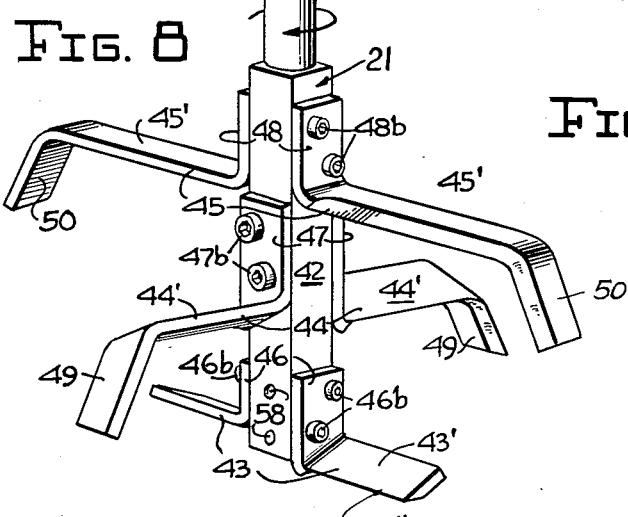
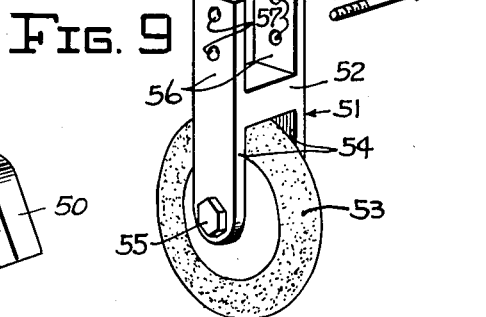
INVENTOR.
Raymond J. Arndt
BY
Hansen and Lane
HIS ATTORNEYS.

United States Patent Office 2,755,718
Patented July 24, 1956

2,755,718

SELF-PROPELLED ROTARY TILLER

Raymond J. Arndt, Redwood City, Calif.

Application January 10, 1955, Serial No. 480,864

5 Claims. (Cl. 97—43)

This invention relates to tillers, and pertains more particularly to the smaller, hand controlled, power-driven tillers of the type used to break up the soil in plots of ground for purposes of cultivation.

One of the principal objects of this invention is to provide a tiller having a downwardly extending rotary tine spindle adapted to dig into the ground and acting to loosen and pulverize the soil.

A further object is to provide such a rotary tine spindle with radially extending tines which will bore into the ground with an auger-like action and act to propel to a higher level soil lying beneath the surface.

Another object is to provide such a rotary tine spindle with blade-like tines having sharpened leading edges to work through the ground with a shearing-like cutting action.

A still further object is to provide some of the radially extending tines with bent down tip portions upon which the tiller will tend to "walk" and thus propel itself in a direction generally normal to the axis of the rotary tine spindle; the particular direction and rate of such travel being governed by the direction of tilt and the angular amount of such tilting of the tiller as controlled by the operator.

Yet another object is to provide a tiller which is light enough in weight to permit its easy handling and control by the operator, and which is compact and low enough in overall height to permit its working of the soil closely adjacent to the trunks of small trees, bushes and the like, and under the overhanging limbs thereof.

These and other objects and advantages of this invention will become apparent from a reading of the following description and the accompanying drawings in which:

Fig. 1 is a perspective view of the tiller.

Fig. 2 is a front elevation view of the tiller in a laterally tilted position.

Fig. 3 is a front elevation view similar to Fig. 2 but at a greater angle of tilt and in a position to cause a "walking" movement over the surface of the ground.

Fig. 4 is a "bird's eye" view looking straight down on a field being tilled by the tiller, and showing the tiller tilted laterally to the right and causing travel of the tiller in the direction indicated by the large arrow.

Fig. 5 is a view similar to Fig. 4 but showing the tiller laterally tilted to the left and causing travel in a direction opposite to that of Fig. 4 as indicated again by a large arrow.

Fig. 6 is a side elevation view partly in section, certain parts broken away to show the internal power transmission mechanism of the tiller, this view showing the tiller in a position it will assume relative to the ground when in normal use.

Fig. 7 is a bottom view of the tiller with a portion of the bottom cover plate broken away to show the driving mechanism and the supporting frame structure.

Fig. 8 is an enlarged perspective view of the rotary tine spindle.

Fig. 9 is a perspective view of an auxiliary wheel attachment for connecting to the tine spindle.

Fig. 10 is a side elevation view of the tiller with the wheel attachment of Fig. 9 installed thereon.

Referring in detail to the drawings, the numeral 11 indicates a housing assembly having a frame structure 12 which comprises an upper U-shaped member 13 and a lower U-shaped member 14 which are horizontally spaced apart by a plurality of upright members 15.

At the rear portion of the frame structure 12 and secured thereto as an integral part thereof, is an upper transverse member 16 joining together the end portions 13' and 13" of the upper U-shaped member 13, and a lower transverse member 17 joining together the ends 14' and 14" of the lower U-shaped member 14. These transverse members 16 and 17 act as supports for the attachment of two vertical motor-carrying beams 18 and 19 which are rigidly secured thereto. The source of power 20 for purposes of the present disclosure is shown as consisting of an electric motor. It should therefore be understood that any self contained source of power could be used. The motor 20 is mounted upon the vertical beams 18 and 19 by means of bolts and has its drive shaft vertically disposed. The power transmission system for the present device may be any well known arrangement of gears, chain and sprockets or as shown, a belt and pulley system.

The power is transmitted from the motor 20 to the tine spindle 21 by means of a two-stage set of pulleys and V-belts and, as shown in Fig. 6, consists of a motor belt 22 driving the large pulley 23 upon the intermediate shaft 24 at a semi-reduced speed. A further reduction in speed is accomplished by means of the dual belts 25 transmitting power from the small pulleys 26 on shaft 24 to the large pulleys 27 on the spindle shaft 21'.

The intermediate shaft 24 is held in place by journals 28 and 28' mounted upon transverse journal support beams 29 and 29' rigidly secured to the upper U-frame 13 and the lower U-frame 14 respectively. The tine spindle shaft 21' is held in place by the journals 30 and 30' mounted upon transverse journal support beams 31 and 31' secured to the upper U-frame 13 and the lower U-frame 14 respectively.

The motor 20 and the power transmitting system is almost totally enclosed by a hood 32 to protect them from dirt, rocks, the elements, and the like. This hood 32 is attached exteriorly of the frame structure 12 and consists of a top cover plate 33, a bottom cover plate 34, and a side cover plate 35 which extends around the entire front and the two sides of the frame 12. The bottom cover plate 34 has an aperture 36 through which the tine spindle shaft 21' projects to drive the tine spindle 21.

Integrally attached to the rear end of the frame structure 12 is a pair of handles 37 which run upwardly and rearwardly therefrom and include an angularly set pair of hand grips 38. A cross bar 39 set between the handles 37 serves to brace them and also acts as a support for an electric switch 40 leading into the electric cord 41.

As shown in detail in Fig. 8, the rotary tine spindle 21 comprises an elongated square hub portion 42 depending from the spindle shaft 21' and has attached to the said hub three pairs of horizontally spaced, radially extending, flattened earth working tines such as are indicated by the numerals 43, 44 and 45. These tines 43, 44 and 45 each have bent up inner end portions 46, 47 and 48 respectively for mounting flatly against the squared sides of the hub 42 and are attached thereto by means of bolts 46b, 47b and 48b. The two lowermost tines 43 mounted at the lower extremity of the hub 42 are relatively short in a radial direction and are mounted at opposite sides of the square hub 42. These lowermost tines 43 are constructed so that their blade portions 43' are inclined at an angle of pitch with respect to their plane of rotation so as to cause them to have a spirally boring action into the ground as the tine spindle 21 is rotated, and at the same time acting to throw the soil upwardly in auger fashion. I have found that a pitch angle of approximately 25° is suitable for these blades. The leading edges 43" of the tine blades 43' are sharpened to more easily penetrate the soil and to chop up roots of weeds and the like.

The intermediate tines 44 are set approximately half way up the sides of the squared hub 42 and have blade portions 44' of somewhat greater length in a radial direction than the tine blades 43'. The blade portions 44' are also set at an angle of pitch of rotation for the same reasons as was given previously for the tine blades 43', and also have their leading edges sharpened in like manner. It will be noted that the intermediate tines 44 are set planwise 90° from the tines 43. In addition, the intermediate tines 44 are provided with downwardly bent tip extensions 49 which act to break up and mulch the soil through which they pass. In addition thereto, and as will be more fully explained later, the tip extensions 49 act as "feet" permitting the tiller to "walk" over the surface of the ground.

The uppermost pair of radial tines 45 are mounted near the top portion of the hub 42 directly above the tines 43 and have blade portions 45' of still greater length than the intermediate tine blades 44' and, like the latter, also have downwardly bent tip extensions 50. However, unlike the two lowermost pairs of tine blades 43' and 44', the uppermost pair of tine blades 45' do not have any angular pitch but are set parallel to their common plane of rotation as clearly shown in Fig. 8. It is to be noted that all tine blades 43', 44' and 45' and including the tip extensions 49 and 50 have their leading edges beveled or sharpened to reduce resistance in passing through the soil.

In order to more fully understand the action and mode of use of this invention it will be necessary to refer to Figs. 2 through 5. But first of all it should be clear that if the tiller is in operation in a position such as is shown in Fig. 6 with the axis of its rotating tine spindle 21 held in perfectly vertical position, there will be no tendency for the tine spindle 21 to shift sidewise from its original axis of rotation. Instead it will merely spirally dig itself straight down into the soil until the bottom of the housing assembly 11 comes in contact with the ground. If, however, the axis of the tine spindle 21 is tilted in some direction such as is shown in Fig. 2, it is apparent that at least the uppermost tines 45 will tend to emerge from the ground at a point opposite to the direction of tilt. Conversely, at the opposite side of the path of rotation of the tine spindle 21, the tines 45 will tend to be thrust deeper into the soil and, as a result thereof, a thrust force will be generated to propel the tine spindle 21 in a direction normal to its axis of rotation and also generally perpendicular to the plane of tilting. Thus by proper manipulation of the tiller by means of the handle grips 38 it will be possible to "steer" the tiller in any directional path simply by tilting the tiller in a correspondingly proper direction.

It will be found that various operators will handle the tiller in somewhat different ways depending upon the type of soil encountered, different environmental conditions (i. e., near buildings, in open fields or under bushes, etc.) or depending upon the individual operating habits and skills of the operator. But I have found, for example, that for tilling open fields it is quite desirable to proceed approximately as shown in the "bird's eye" view of Fig. 4 wherein the tiller is shown tilted to the right or starboard side while at the same time the rear of the tiller is elevated slightly so that the resultant direction of tilt of the tine spindle 21 will be somewhat along the line of direction A which will in turn cause the tiller to progress in a direction of travel B, leaving behind the cultivated path C, providing of course that the tine spindle 21 is rotating in a clockwise direction as shown in this figure.

This manner of use of the tiller will permit the operator to follow along at one side of the cultivated path "C" without walking thereon.

Fig. 5 is a view similar to Fig. 4 except that the direction of tilt D and the direction of travel E are opposite thereto, thus tilling the return path shown at F.

It has been found that the rate of travel along any given direction or path such as C and F in Figs. 4 and 5 will be governed by the amount of tilt given the tine spindle 21. If the tine spindle 21 is tilted to only a very small angle, the tiller will proceed very slowly along the ground but will pulverize the soil very thoroughly and deeply. On the other hand, if the tiller is given a very steep angle of tilt as shown in Fig. 3, the tine spindle 21 will almost entirely emerge from the ground and move relatively fast over the surface thereof without any perceptible tilling action. This is very useful in moving the tiller from one cultivating site to another in the normal course of its work in a field. During the course of such travel, the tiller will "walk" alternately on the downwardly bent tip portions 49 and 50 of the tines 44 and 45 as they are rotated.

As best shown in Fig. 3, by the addition of phantom lines for the intermediate tines 44, the tips of all tines 43, 44 and 45 lie generally in a common cone of revolution G so that the tine spindle 21 will roll along the ground relatively smoothly when the tiller is tilted over far enough to bring the cone of revolution G substantially tangent to the ground as shown.

As shown in Fig. 9, a detachable wheel assembly 51 has been provided for attachment to the bottom end of the tine spindle hub 42 and is shown attached thereto in Fig. 10. It consists of an H-shaped bracket 52 carrying the wheel 53 in its lower forks 54 by means of pivot pin 55, the upper forks 56 having bolt holes 57 to match bolt holes 58 in the hub 42 for temporarily fastening the parts together by means of the bolts 59. This wheel attachment 51 is for the purpose of facilitating the moving of the tiller from one place to another by permitting the tiller to be pushed around in wheelbarrow-like fashion.

While I have illustrated and described a preferred embodiment of the present invention it will be understood that various changes and modifications may be made in the details thereof without departing from the spirit of the invention.

Having thus described my invention, what I desire to claim and secure by Letters Patent is:

1. An earth tilling cultivator comprising a frame having a source of power mounted thereon, a downwardly extending rotary spindle journaled for turning movement relative to said frame, power transmission means on said frame for drivingly connecting said source of power with said spindle for turning the latter, said frame having a pair of handles extending wheel-barrow fashion for supporting said frame above earth solely upon said spindle, said spindle having a plurality of diametrically disposed sets of blades, one said set of blades disposed at the extreme end of said spindle being inclined at an angle to enter earth in auger fashion, and another set of said blades disposed in a plane above said first one set thereof provided with downwardly extending outer tips engaging earth uniformly when said spindle is vertically disposed and effecting sidewise movement of said frame upon tilting of said frame by manipulation of said pair of handles.

2. An earth tilling cultivator comprising a frame having a downwardly extending rotary spindle journaled for turning movement relative to said frame, power transmission means on said frame drivingly connected with said spindle for turning the latter, said frame having a pair of handles extending wheel-barrow fashion for supporting said frame above earth with said spindle only engaging the earth, said spindle having a plurality of diametrically disposed sets of blades, one said set of blades disposed at the extreme lower end of said spindle being inclined at an angle to enter earth in auger fashion, a second set of said blades disposed in a plane above said first one set thereof and provided with downwardly extending outer tips engaging earth uniformly when said spindle is vertically disposed and adapted to effect sidewise movement of said frame upon tilting thereof by manipulation of said pair of handles, and a third set of diametrically disposed blades disposed in a plane above said second set thereof extending a substantially greater distance from said spindle than said second set of blades and having angularly downwardly extending tips adapted to engage the earth in wheel-like fashion upon tilting of said framework at a greater angle for effecting fore and aft movement of said framework over the earth dependent upon right or left hand tilting of said framework by manipulation of said handles.

3. An earth tilling cultivator comprising a frame having a downwardly extending rotary spindle journaled for turning movement relative to said frame, power transmission means on said frame drivingly connected with said spindle for turning the latter, said frame having a pair of handles extending wheel-barrow fashion for supporting said frame above earth with the base end of said spindle only engaging earth, said spindle having a plurality of diametrically disposed sets of blades, one said set of auger blades disposed at the extreme end of said spindle being short and inclined at an angle to enter earth in auger fashion, a second set of said blades disposed above said first one set thereof and at 90° relative thereto provided with downwardly extending outer tips at a greater radial distance from said spindle than are the ends of said auger blades for engaging earth uniformly when said spindle is vertically disposed but adapted to effect sidewise movement of said frame upon slight tilting thereof by manipulation of said pair of handles, and a third set of blades disposed above said second set thereof in parallelism with said auger blades provided with downwardly extending outer tips at a still greater radial distance from said spindle than the outer tips of said second set of blades for engaging earth in wheel-like fashion to effect fore and aft movement of said framework over the earth when the framework is tilted a greater angle relative thereto than said slight tilting effecting sidewise movement.

4. An earth tilling cultivator comprising a frame having a downwardly extending rotary spindle journaled for turning movement relative to said frame, power transmission means on said frame drivingly connected with said spindle for turning the latter, said frame having a pair of handles extending wheel-barrow fashion for supporting said frame above earth with the base end of said spindle only engaging earth, said spindle having a plurality of diametrically disposed sets of blades, one said set of auger blades disposed at the extreme end of said spindle being short and inclined at an angle to enter earth in auger fashion, a second set of said blades disposed above said first one set thereof and at 90° relative thereto, said second set of blades being inclined to dispose their leading edge lowest and provided with downwardly extending outer tips at a greater radial distance from said spindle than are the ends of said auger blades for engaging earth uniformly when said spindle is vertically disposed but adapted to effect sidewise movement of said frame upon slight tilting thereof by manipulation of said pair of handles, and a third set of blades disposed above said second set thereof in parallelism with said auger blades provided with downwardly extending outer tips at a still greater radial distance from said spindle than the outer tips of said second set of blades for engaging earth in wheel-like fashion to effect fore and aft movement of said framework over the earth when the framework is tilted a greater angle relative thereto than said slight tilting effecting sidewise movement.

5. An earth tilling cultivator comprising a frame having a source of power mounted thereon, a downwardly extending rotary spindle journaled for turning movement relative to said frame, power transmission means on said frame for drivingly connecting said source of power with said spindle for turning the latter, a pair of handles extending wheel-barrow fashion from said frame for supporting the same above earth with said spindle solely engaging the earth, a plurality of diametrically disposed sets of blades, the first one of said sets of blades being relatively short and secured to said spindle at its earth engaging end, the second set of said blades being secured to said spindle in a plane above said first set of said blades and extending a greater radial distance from said spindle than said first set of said blades, and a third set of blades secured to said spindle in a plane above said second set of said blades and extending a greater radial distance from said spindle than said second set thereof, said three sets of blades when turning with said spindle having their extreme ends defining a substantially conical orbit such as to effect sidewise movement of said framework upon slight tilting of said framework and to effect fore or aft movement of said framework dependent upon the direction of tilting and upon greater tilting of said framework at the option of the operator by manipulation of said pair of handles.

References Cited in the file of this patent

UNITED STATES PATENTS

| Number | Name | Date |
|---|---|---|
| 2,540,933 | Conway | Feb. 6, 1951 |
| 2,614,474 | Merry | Oct. 21, 1952 |
| 2,625,867 | Hands | Jan. 20, 1953 |
| 2,684,495 | Litkenhous | July 27, 1954 |
| 2,699,605 | Setter | Jan. 18, 1955 |